Figure 1:
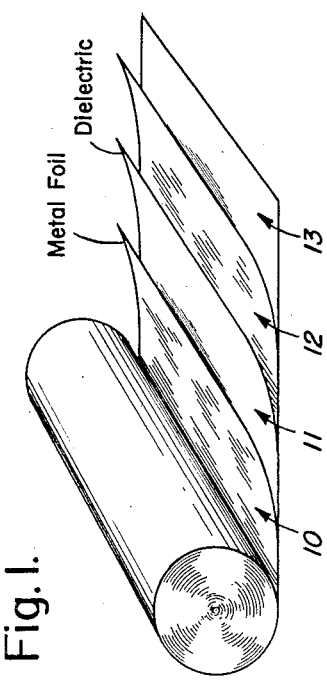

Feb. 10, 1953     W. F. BUSSE ET AL     2,628,265
SULFOLANES AS DIELECTRIC MATERIAL
Filed Feb. 27, 1948

INVENTORS
Warren F. Busse
Hugh R. Davidson

ATTORNEYS

Patented Feb. 10, 1953

2,628,265

UNITED STATES PATENT OFFICE 2,628,265

SULFOLANES AS DIELECTRIC MATERIAL

Warren F. Busse and Hugh R. Davidson, Easton, Pa., assignors to General Aniline & Film Corporation, New York, N. Y., a corporation of Delaware Application February 27, 1948, Serial No. 11,544

9 Claims. (Cl. 175—41)

This invention relates to improved electrical condensers of high capacity and small volume, wherein a cyclic sulfone is employed as a dielectric.

The size of the condensers employed in numerous types of electrical equipment is frequently governed by the electrical properties of the material employed as a dielectric in their construction and efforts to decrease the size of such condensers or conversely to increase the capacity of a condenser of given size are prevented by the limitations of the dielectric materials which heretofore have been available.

It has been suggested that aromatic sulfones, such as diphenyl sulfone, di-β-naphthyl sulfone and the like, which have a high dielectric constant when in liquid state would be of value as dielectric materials in the construction of electrical condensers. However, many of these materials are solids at room temperature and in this state have relatively low dielectric constants. While they sometimes can be obtained in a supercooled liquid state at room temperature, there is a danger of crystallization on standing and attempts to lower the melting point of the sulfone by the use of mixtures of isomeric sulfones, which mixtures would remain liquid at room temperature, have not been entirely successful since such mixtures have the disadvantage of having a relatively high dissipation factor at certain frequencies due to energy losses caused by rotation of the dipoles. Likewise, attempts to keep aromatic sulfones liquid at room temperature to reduce the loss to dipole rotation by adding thereto diluents such as mineral oil, diphenyl oxide, chlorinated naphthalenes, etc., have not met with success, since these diluents have a much lower dielectric constant than the aromatic sulfone and thus the capacity of the condensers in which such mixtures are used as dielectrics is reduced.

We have now discovered that cyclic sulfones (i. e. tetramethylene sulfones) such as sulfolane (tetrahydrothiophene-1-dioxide) and alkyl substituted sulfolanes, such as 2-methyl-tetrahydrothiophene-1-dioxide, 2,4-dimethyltetrahydrothiophene-1-dioxide and 2,5-dimethyltetrahydrothiophene-1-dioxide, which are liquid at room temperatures, have high dielectric constants comparable to those of aromatic sulfones but without many of their disadvantages, and we have further discovered that by constructing electrical condensers employing such cyclic sulfones as dielectrics, the capacity of a given condenser can be substantially increased or conversely the size of a condenser of a given capacity may be substantially decreased.

The sulfolanes which we have found to be of particular value as dielectrics in the manufacture of electrical condensers can be prepared by reacting conjugated dienes with sulfur dioxide and hydrogenating the product, as described by H. G. Staateman, R. C. Morris, R. M. Stager and C. J. Pierotti in Chemical Progress, vol. 43, Trans. p. 148, April 1947. The unsaturated sulfolanes are less stable and tend to give off $SO_2$, which makes them less suitable for use as a dielectric than are sulfolane and the alkyl substituted sulfolanes. These sulfolanes are considered chemically stable up to about 240° C., but traces of $SO_2$ may be given off at somewhat lower temperatures. Because of high dielectric constant of the sulfolanes, they tend to ionize impurities which may be present and thus have a high dissipation factor, particularly at low frequencies. For this reason, they must be highly purified to obtain the best properties in condensers. The purification method that is most effective will depend somewhat on the particular impurities present, but the methods that give the best results are usually those that take out water, acid and alkaline impurities. Moisture and dissolved gases, such as, $CO_2$ and $SO_2$ can be removed by heating to, say, 100° C. at a pressure of 1 mm. of mercury or less. Non-volatile acid and basic impurities may be removed by adsorption on a suitable material, such as fuller's earth, activated alumina, silica gel, or certain resins.

While all sulfolanes are, as indicated above, preferably employed in a pure state, in producing condensers in accordance with the present invention, they may, if desired, be mixed with aromatic sulfones in order to obtain materials of higher dielectric properties than are obtained when the aromatic sulfones which have heretofore been suggested for use as dielectrics are mixed with materials of lower dielectric constant. Thus, when tolyl xylyl sulfone was mixed with 50% diphenyl oxide, the mixture had a dielectric constant of 12 at 0° C. and decreased in a straight line to a dielectric constant of 9.5 at 70° C., while when tolyl xylyl sulfone was mixed with 50% of dimethyl sulfolane, the resulting mixture had a dielectric constant at 0° C. of 24, which decreased in a straight line to 19.75 at 70° C. The dissipation factor of the mixture was also substantially improved. It has also been found that the dielectric constant of the sulfolanes is equal to or higher than the dielectric constant of the aromatic sulfones, and in addition the dielectric constant of the sulfolanes remains constant to a much higher frequency than is the case with the aromatic sulfones. Thus, dimethyl sulfolane had a dielectric constant at room temperature of about 27.5 at the frequency of 10 cycles per second and this dielectric constant decreased only to about 25.8 at a frequency of $10^7$ cycles, while in the case of tolyl xylyl sulfone, the material had a dielectric constant of 20 at 10 cycles and the dielectric constant remained substantially constant until a frequency of $10^5$ cycles. It then dropped rapidly in the frequency range of $10^5$–$10^7$ cycles to 5.

Figure 2:
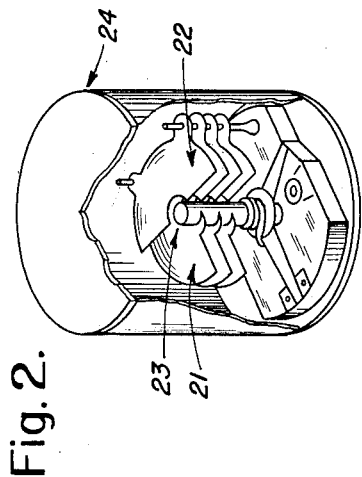
Figure 3:
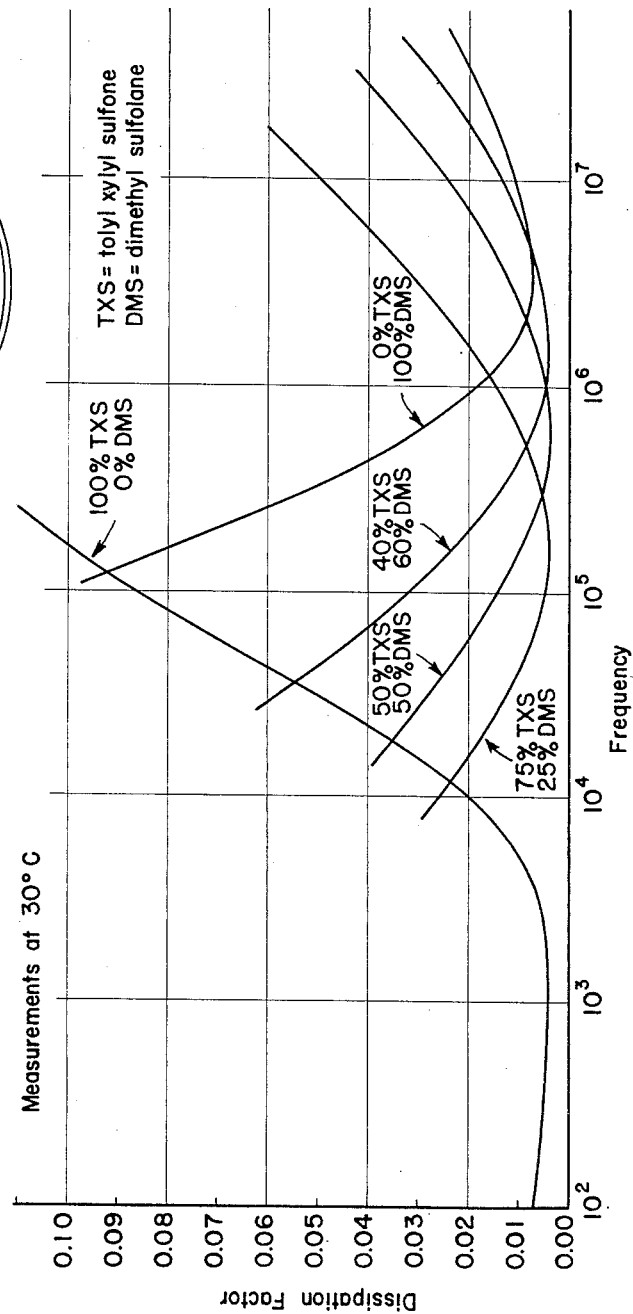

In order to facilitate the description of the present invention, there are attached hereto as a part of this specification several figures of drawings, wherein:

Fig. 1 is a diagrammatic illustration of a rolled condenser embodying the improvements of this invention, while Fig. 2 is an illustration of a variable condenser embodying the features of the present invention, and Fig. 3 is a graph showing the dissipation factor of dimethyl sulfolane and tolyl xylyl sulfone and mixtures thereof of various frequencies.

The use of aromatic sulfones as a dielectric are limited by their high losses at high frequencies (due to dipole rotation) while the use of the sulfolanes in practice are limited by their relatively high losses at low frequencies. These disadvantages may be overcome to a certain extent by using mixtures of the two materials. The dielectric constant of such a mixture is only slightly dependent upon the composition, but the frequency of minimum loss is markedly dependent upon the composition. The mixture may be so chosen as to place the frequency of minimum loss anywhere between that for pure sulfone and pure sulfolane. This choice will depend upon the frequency and temperature range over which it is desired to operate the condenser.

The dissipation factor of condensers like those shown in Figure 2, containing as a dielectric various mixtures of an aromatic sulfone and a sulfolane, is shown in Figure 3. The pure tolyl xylyl sulfone has a dissipation factor below 2% only at frequencies below $10^4$ cycles, which is in the audio frequency range. Pure 2:4 dimethyl sulfolane has a dissipation factor below 2% only between about $10^6$ to $2 \times 10^7$ cycles, which is too high a range for the usual radio broadcast frequencies of 0.5 to $1.5 \times 10^6$ cycles. However, a mixture of 60% dimethyl sulfolane and 40% tolyl xylyl sulfone has a dissipation factor below 2% throughout the whole broadcast range.

If a condenser is wanted for an intermediate frequency stage (around $10^5$ cycles) of a superheterodyne receiver operating at normal temperatures, a mixing of 25% dimethyl sulfolane and 75% tolyl xylyl sulfone will be found to give the lowest dissipation factor.

Referring now to Fig. 1, 10 designates an electrode of aluminum foil or similar conducting material; 11 represents a sheet of porous dielectric material, such as paper, impregnated with a sulfolane; 12 designates a second sheet of aluminum foil or similar conducting material; while 13 designates a second sheet of porous dielectric impregnated with a sulfolane. The condenser was produced by rolling the materials as is customary with rolled condensers and the rolled condenser was then heated for 2 hours at 0.8 mm. pressure to remove moisture from the paper. The condenser was then impregnated with dimethyl sulfolane in the manner common for impregnating condensers with oil or the like. The capacity of this condenser was .061 $\mu$f. before impregnation and 0.270 $\mu$f. after impregnation. A similar condenser impregnated with oil increased from 0.06 $\mu$f. to .11 $\mu$f. on impregnation. While the sulfolane increased the capacity of the condenser to a value considerably above that which could be obtained with oil, the increase is not as great as one might expect from the difference of the dielectric constant of the oil and the sulfolane. This is because a substantial amount of the space between the electrodes of the condenser is occupied by the paper, which has a relatively low dielectric constant, and only a portion of this space is occupied by the impregnating fluid.

Referring now to Fig. 2, a variable air condenser comprising fixed plates 22 and movable electrode plates 21 fixedly mounted on rotating shaft 23 was immersed in a container 24 filled with dimethyl sulfolane. The maximum capacity of this condenser was 16 mmf. with air as the dielectric, while when immersed in sulfolane the maximum capacity was then 428 mmf. It will thus be apparent that the condensers of the present invention, wherein sulfolane is employed as the dielectric, permits the size of the condenser to be reduced without reducing the capacitance, a property of considerable importance in condensers for use in certain types of radio and radar equipment where it is desirable to reduce the size and weight of the condensers as much as possible and also of importance in large installations, for instance for correcting the power factor of commercial 60-cycle power lines where it is desired to reduce the cost of the large condensers which are now required.

We claim:

1. In an electrical condenser comprising electrically conducting members separated by dielectric material and wherein the dielectric material separating the electrodes comprises a liquid organic dielectric material, the improvement which comprises employing as said liquid organic dielectric material a liquid sulfone material selected from the group consisting of normally liquid sulfolanes and mixtures of such normally liquid sulfolanes with known aromatic sulfone dielectrics which mixtures contain at least 25% of a normally liquid sulfolane.

2. In an electrical condenser comprising electrically conducting members separated by dielectric material and wherein alternate electrodes are separated by a sheet of porous dielectric material impregnated with a liquid organic dielectric material, the improvement which comprises employing as said liquid organic dielectric material a liquid sulfone material selected from the group consisting of normally liquid sulfolanes and mixtures of such normally liquid sulfolanes with known aromatic sulfone dielectrics which mixtures contain at least 25% of a normally liquid sulfolane.

3. In an electrical condenser comprising electrically conducting members separated by dielectric material and wherein alternate electrodes are separated by a liquid dielectric material, the improvement which comprises employing as said liquid dielectric material a liquid sulfone material selected from the group consisting of normally liquid sulfolanes and mixtures of such normally liquid sulfolanes with known aromatic sulfone dielectrics which mixtures contain at least 25% of a normally liquid sulfolane.

4. An electrical condenser as defined in claim 1, wherein said liquid organic dielectric material consists of a normally liquid sulfolane.

5. An electrical condenser as defined in claim 2, wherein said liquid organic dielectric consists of a normally liquid sulfolane.

6. An electrical condenser as defined in claim 3, wherein said liquid dielectric consists of a normally liquid sulfolane.

7. An electrical condenser as defined in claim 1, wherein the liquid sulfolane specified is a dimethyl sulfolane.

8. An electrical condenser as defined in claim 1, wherein said normally liquid organic dielectric material consists of a dimethyl sulfolane.

9. A liquid organic dielectric material having dissipation factor at 30° C. below 2% within the range of 0.5 to $1.5 \times 10^6$ cycles and consisting of a mixture of about 60% 2:4 dimethyl sulfolane and 40% tolyl xylyl sulfone.

WARREN F. BUSSE.
HUGH R. DAVIDSON.

REFERENCES CITED

The following references are of record in the file of this patent:

UNITED STATES PATENTS

| Number | Name | Date |
|---|---|---|
| 2,211,019 | Lommel | Aug. 13, 1940 |
| 2,434,540 | Berberich | Jan. 13, 1948 |